E. JONES & J. HALL.
SPROCKET WHEEL FOR CUTTING CHAINS.
APPLICATION FILED OCT. 30, 1909.

1,013,173.

Patented Jan. 2, 1912

Witnesses
Benj. Finckel
Maynie Foard

Inventors
Ebenezer Jones
John Hall
by Finckel & Finckel
Attorneys

UNITED STATES PATENT OFFICE.

EBENEZER JONES, OF MARTINS FERRY, OHIO, AND JOHN HALL, OF INGRAM, PENNSYLVANIA.

SPROCKET-WHEEL FOR CUTTING-CHAINS.

1,013,173. Specification of Letters Patent. Patented Jan. 2, 1912.

Application filed October 30, 1909. Serial No. 525,508.

*To all whom it may concern:*

Be it known that we, EBENEZER JONES and JOHN HALL, citizens of the United States, residing, respectively, at Martins Ferry and Ingram, in the counties of Belmont and Allegheny and States of Ohio and Pennsylvania, have invented a certain new and useful Improvement in Sprocket-Wheels for Cutting-Chains, of which the following is a specification.

The object of this invention is to provide an improved sprocket wheel especially adapted for use in combination with and for driving the cutter chain in a mining machine of the sort shown in Letters Patent of the United States granted to us July 13, 1909, No. 928,056.

The invention is embodied in the construction and combination herein shown set forth and pointed out in the claims.

Figure 1:
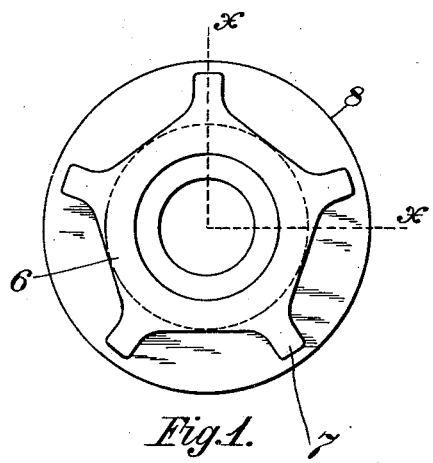
Figure 2:
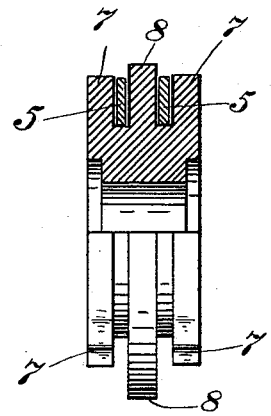
Figure 3:
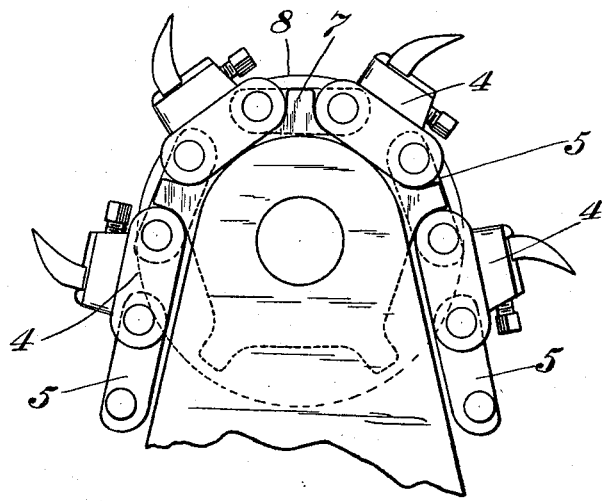

In the drawing: Figure 1 is a side view of the wheel. Fig. 2 is a combined section and edge view on the line $x$—$x$ Fig. 1 showing the position of the chain thereon. Fig. 3 is a side view showing the apex end of the sliding frame of a breast machine equipped with the sprocket wheel.

In the views 4 designates the cutter bit blocks which are of U-form generally speaking in cross section and 5 links for connecting them. As in our former patent referred to the links can be held in connection with the legs of the links by the guide of the frame.

6 designates the sprocket wheel generally which has a plain narrow annular portion 8 at its rim to extend between the links 5 and hold the latter engaged with the blocks 4. Each side of the sprocket wheel is provided with a row of sprocket teeth 7, 7, spaced apart to project between the legs of adjacent blocks as the chain is drawn or passes around the sprocket. When the chain is to be driven by this wheel the sprockets will press against the heels of the legs at opposite sides of the chain and draw and impel the chain around the frame. In bit blocks of the kind referred to the bits are secured in sockets at opposite sides of the block and in line with the pressure of the sprockets on the blocks hence the chain is drawn with great evenness and steadiness and with less friction on the guide than where the pressure is at one point.

Among other advantages of this invention are that the life of the sprocket and chain are greatly prolonged.

What we claim is:

1. In means of the kind described a sprocket wheel having an annular row of sprocket teeth on its rim at each of the opposite sides thereof and an annularly projecting portion on its rim separated from and between said teeth, there being a space or channel between each row of the teeth and the said annularly projecting portion for the reception of the connecting links of a chain, substantially as described.

2. In means of the kind described, a chain supporting frame, a sprocket wheel mounted therein having an annular row of sprocket teeth at each of the opposite sides thereof and an annularly projecting portion on its rim between said teeth, in combination with a chain driven by said wheel comprising U-shaped blocks and separate parallel links connecting the corresponding legs of adjacent blocks, the ends of said links being located adjacent the inner sides of said legs, and the bodies or middle portions of the links lying between the teeth at the corresponding side of the wheel and the said annularly projecting portion of the wheel, substantially as described.

EBENEZER JONES.
JOHN HALL.

Witnesses:
BENJ. FINCKEL,
MAYME FOARD.

Copies of this patent may be obtained for five cents each, by addressing the "Commissioner of Patents, Washington, D. C."